United States Patent [19]
Bannister et al.

[11] 3,880,569
[45] Apr. 29, 1975

[54] METHOD FOR THICKENING, IGNITING AND PROJECTING HYDROCARBON FUELS

[76] Inventors: William W. Bannister, John R. Pennace, William A. Curby, all c/o Alice Sias Memorial Laboratory, 211 Summit Ave., Brookline, Mass. 02146

[22] Filed: Dec. 26, 1972

[21] Appl. No.: 318,422

Related U.S. Application Data

[63] Continuation of Ser. No. 73,556, Sept. 18, 1970, abandoned, which is a continuation-in-part of Ser. No. 73,634, Sept. 18, 1970, Pat. No. 3,684,733.

[52] U.S. Cl............. 431/4; 44/7 A; 44/7 C; 44/7 D; 89/1 A; 431/2; 431/91
[51] Int. Cl............. F23j 7/00; C10l 7/00
[58] Field of Search............. 431/4, 91, 2; 89/1 A; 44/7 A-D

[56] References Cited
UNITED STATES PATENTS
| | | | |
|---|---|---|---|
| 2,851,094 | 9/1958 | Griffin | 89/1 A |
| 3,038,530 | 6/1962 | Fowler | 431/91 |
| 3,285,718 | 11/1966 | Whitfield et al. | 44/7 A |
| 3,335,780 | 8/1967 | Klaubert | 431/91 |

*Primary Examiner*—Benjamin R. Padgett
*Assistant Examiner*—E. A. Miller
*Attorney, Agent, or Firm*—Krafft & Wells

[57] ABSTRACT

A method for projecting a gelled liquid hydrocarbon, whereby a solution of a suitable compound in a normally liquid hydrocarbon is projected under pressure from a reservoir tank through an orifice, at which orifice a solution of a suitable compound is added under pressure to the first hydrocarbon solution, causing a gelling reaction between the two suitable compounds; and at which orifice the combined stream of thickened fuel is caused to be ignited.

3 Claims, 2 Drawing Figures

INVENTORS
WILLIAM W. BANNISTER
JOHN R. PENNACE
WILLIAM A. CURBY

BY *Krafft & Wells*

ATTORNEYS

METHOD FOR THICKENING, IGNITING AND PROJECTING HYDROCARBON FUELS

CROSS REFERENCES TO RELATED APPLICATIONS

Applicants incorporate herein the disclosures of co-pending applications of Bannister, Pennace and Smith, entitled "Methods for Separation and Purification of Aliphatic Amines", Ser. No. 73,633, and now abandoned, and of Bannister Pennace and Curby, entitled "Gelation of Liquid Hydrocarbons," Ser. No. 73,634, both filed on the same day as the present application. The present application is a continuation of application Ser. No. 73,556, filed Sept. 18, 1970, which in turn is a continuation-in-part of application Ser. No. 73,634, filed Sept. 18, 1970, now U.S. Pat. No. 3,684,733.

BACKGROUND OF THE INVENTION

The field of the invention is solidified liquids for fuels and igniting devices. The present invention is particularly concerned with the method of gelling a hydrocarbon composition and the apparatus for projecting and igniting this.

The state of the prior art of gelling liquid hydrocarbons, such as gasoline, may be ascertained by reference to the Kirk-Othmer "Encyclopedia of Chemical Technology," Vol. 4 (1964), pages 893–894 under the section "Flame Agents," U.S. Pat. No. 2,606,107 of Feiser, which issued Aug. 5, 1952, and U.S. Pat. No. 2,966,401 of Myerholtz, which issued Dec. 27, 1970. The Feiser patent is the original "Napalm" patent and Myerholtz discloses "Napalm B" which makes use of "ABS" polymers. An apparatus for projecting a multi-compound flammable mixture is disclosed in U.S. Pat. No. 3,447,879 of Smith et al. which issued June 3, 1969.

Equipment and apparatus in present use or heretofore devices for the projection and ignition of thickened hydrocarbon fuels have depended on the use of pre-thickened fuel, projected from an orifice from a fuel tank under pressure and with ignition at the orifice. Despite the viscosity of the thickened fuel, significant ranges of trajectory can be realized with such fuel under the application of sufficiently high pressures with the fuel tank.

SUMMARY OF THE INVENTION

It has been discovered according to the present invention that thickening of the hydrocarbon fuel can be achieved at the orifice of a projecting apparatus, most feasibly by using a solution of an appropriate substance in the hydrocarbon liquid which, upon admixture of another appropriate substance or substances at the orifice of the projector effects more or less immediate gelation of the fuel.

The use of such an apparatus embodying the features outlined above has the following particular advantages;

1. Since the hydrocarbon fuel containing only one of the required reagents for thickening in solution is still a thin liquid of low viscosity, higher ranges of trajectory can be realized with the same pressure as used for a pre-thickened fuel; or alternatively the same trajectory can be realized with less expenditure of pressurizing force. This means lighter equipment and is thus useful in forest fire fighting for the purpose of constructing backfires.

2. Higher viscosities can be achieved, if desired, by using greater ratios of thickening agent to fuel, with thickening being achieved at the orifice; under these conditions, no decrease in range is suffered, and indeed higher ranges can be achieved than when using pre-thickened fuel.

3. Since the hydrocarbon liquid in the fuel tank is still a thin liquid of low viscosity, the contents of the fuel tank can be removed easily by simple draining.

4. A variety of thickened fuel types can be achieved using the same apparatus.

DESCRIPTION OF THE PREFERRED EMBODIMENTS

The following sets of gelling agents have been found to achieve excellent results in prototypes of the apparatus described in this invention (in the following list the reagents are grouped according to their maximum effectiveness when used as a solute in the hydrocarbon fuel or correspondingly as an additive at the orifice of the projector apparatus).

| | Solute in fuel | Additive at nozzle |
|---|---|---|
| 1. | Primary or secondary aliphatic amines | Carbon dioxide, or carbon disulfide |
| 2. | Long chain carboxylic acids, or mixtures of these with naphthenic acid or similar Napalm components | Bases such as metal hydroxides, carbonates, or amines, in water or organic solvents. |
| 3. | Olefinic monomers | Free radical or cationic initiators in appropriate solution |
| 4. | Dicarboxoyl halides | Solutions of di- or polyamines in water or organic solvents; or diols or polyols |

(Note: the above list does not preclude other possibilities wherein gelation can occur in hydrocarbon solutions upon appropriate admixture of two or more reagents in consecutive order).

(The concentrations of the appropriate sets of reagents will depend on the nature of the reactants. Thus, excess quantities of carbon dioxide or carbon disulfide are required for complete gelation of given quantities of amines, whereas catalytic quantities of free radical initiators suffice for olefinic monomers).

BRIEF DESCRIPTION OF THE DRAWINGS (In the discussion to follow, use of the amine — $CO_2$ gelation system is described by way of example. In actual practice, any of the types of reagents cited above as a feasible solute for the fuel can be used instead of the amine, and the corresponding additive at the nozzle for the carbon dioxide. Thus, a palmitic acid-naphthenic acid solution in gasoline can be projected from the fuel tank with aqueous sodium hydroxide being added to the fuel stream at the nozzle, with simultaneous ignition).

The apparatus and method of gelling the hydrocarbon compositions containing the amines may best be explained by reference to the drawings, wherein.

Figure 1:
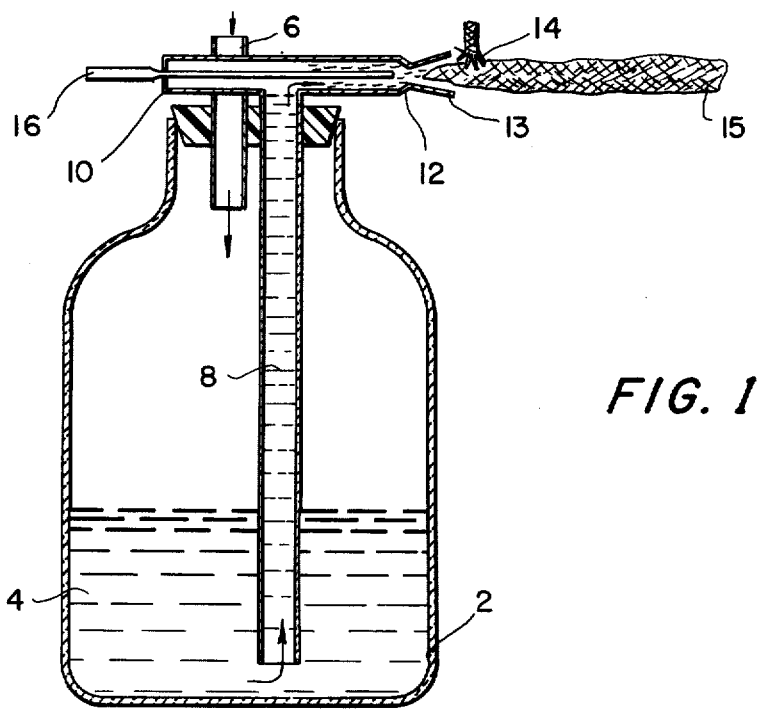
FIG. 1 shows in cross-section a simplified form of flame thrower apparatus.

With particular reference to FIG. 1, the container 2 holds a mixture 4 of hydrocarbon and amine. Pressure is applied to the inside of the container by means of nitrogen, air or other propelling gas through conduit 6. The barrel 10 of the flame thrower receives the hydrocarbon admixed with amine by way of conduit 8. Carbon dioxide is introduced into conduit 16 and the $CO_2$ reacts with the liquid hydrocarbon and amine mixture at the constriction 12 prior to expulsion from nozzle 13 into jet 15. The jet of gelled fuel is ignited by igniter 14.

Figure 2:
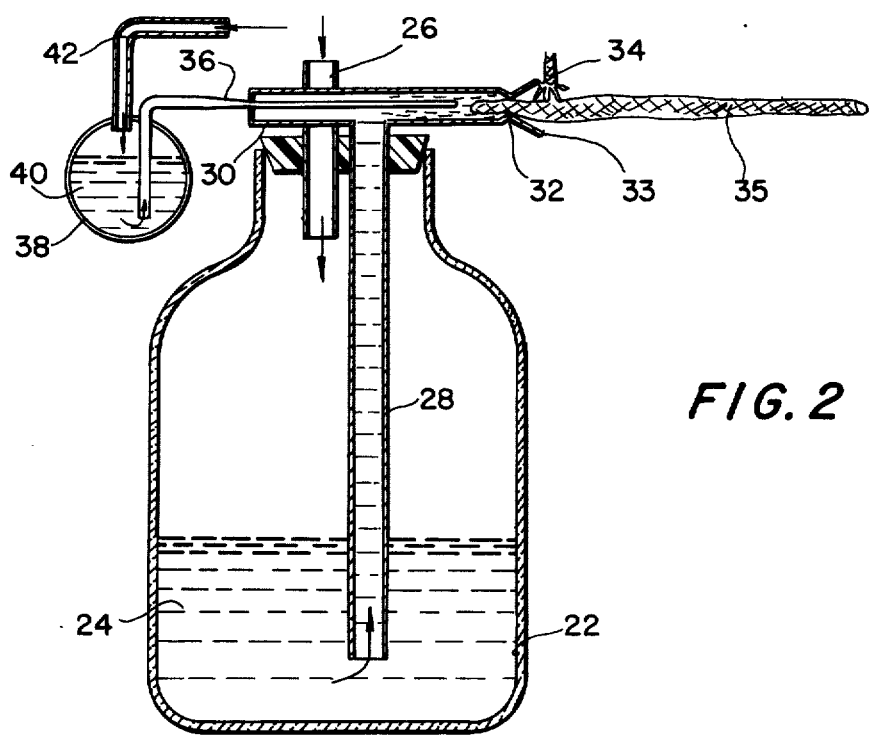
FIG. 2 shows in cross-section a modified form of the apparatus of FIG. 1 wherein a gelling initiator is introduced into the stream being projected.

In the modified form of the apparatus as shown in FIG. 2, the tank 22 holds a mixture 24 of a liquid fuel such as gasoline, plus an additive such as styrene polymer. Nitrogen, air or other propelling gas is introduced into the tank 22 by way of conduit 26 and the solution 24 is forced into flame thrower barrel 30 by way of conduit 28. Tank 38 contains a gelling initiator 40, such as a solution of one part of azo-bis-isobutyronitrile in 9 parts by weight of gasoline. Nitrogen, air or other propelling gas is directed into tank 38 by way of conduit 42 and the gelling initiator 40 is forced through conduit 36 through the barrel 30, and the gelling initiator and solution 24 are admixed at constriction 32. The jet 35 exits from muzzle 33 and is ignited by igniter 34.

Without further elaboration, it is believed that one skilled in the art can, using the preceding description, utilize the present invention to its fullest extent.

EXAMPLE 1.

A solution of 5 parts benzylamine is mixed with 100 parts by weight of gasoline and this solution is added to tank 2 of FIG. 1. Nitrogen gas is introduced under pressure through conduit 6 and carbon dioxide under pressure is introduced through conduit 16. The gasoline/amine mixture is reacted with carbon dioxide gas, expelled and ignited.

EXAMPLE 2.

Example 1 is repeated with the solution of 5 parts benzylamine in 100 parts by weight gasoline, but dry ice is added to the solution in the container 2. This prethickened gel in tank 2 is not easily propelled through the conduit 8 and the barrel 10. There is, therefore, a decided advantage in adding the carbon dioxide to the mixture of gasoline and amine immediately before projecting the gelled fuel as in Example 1.

EXAMPLE 3.

A solution of 5 parts of dodecylamine is mixed with 100 parts by weight of gasoline and this solution is added to tank 2 of FIG. 1. Nitrogen gas is introduced under pressure through conduit 6 and carbon disulfide under pressure is introduced through conduit 16. The resulting gel is expelled and simultaneously ignited.

EXAMPLE 4.

Example 1 is repeated with 1 part of normal n-butylamine in 100 parts by weight of gasoline.

EXAMPLE 5.

A solution of 10 parts by weight of palmitic acid in 90 parts by weight of gasoline is added to tank 22 of FIG. 2. To tank 38 a solution of 25 percent sodium hydroxide in water is added. Pressure is applied by way of conduits 26 and 42 and the contents of tank 22 are mixed with the gelling initiator of tank 38 in the barrel 30. Gelation of the palmitic acid/gasoline solution occurs immediately at the orifice 33 with little or no effect on the trajectory length as compared with tests in which no gelling initiators were used. (For other specific examples of "Napalm" compositions see U.S. Pat. No. 2,606,107).

EXAMPLE 6.

A solution of 10 parts by weight styrene in 90 parts by weight of gasoline is added to tank 22 of FIG. 2. A solution of 1 part by weight of azo-bis-isobutyronitrile in 9 parts by weight of gasoline is added to tank 38. Tank 22 is pressurized by compressed nitrogen spplied through conduit 26 and the tank 38 is pressurized by compressed nitrogen applied through conduit 42. The two solutions are admixed in barrel 30, ejected and ignited at nozzle 33. (For other specific examples of "Napalm B" compositions see U.S. Pat. No. 2,966,401).

EXAMPLE 7.

A solution of 10 parts of isoprene in 90 parts by weight of hexane is placed in tank 22 of FIG. 2. A solution of Ziegler-Natta catalyst is placed in tank 38. The two solutions are pressurized, admixed and ejected from the nozzle 33 without ignition. The fuel is collected at the end of its trajectory and it is found that there is a significant increase in the viscosity.

EXAMPLE 8.

A solution of 10 parts by weight of sebacyl chloride in 90 parts by weight of gasoline is added to tank 22 of FIG. 2. A solution of 1 part by weight of bis-phenol A in 9 parts by weight of pyridine is added to tank 38. Tank 22 is pressurized by compressed nitrogen applied through conduit 26 and the tank 38 is pressurized by compressed nitrogen applied through conduit 42. The two solutions are admixed in barrel 30, ejected and ignited at nozzle 33. Upon extinguishing the flames, it is found that the unburnt fuel is of significantly increased viscosity.

EXAMPLE 9.

Example 8 is repeated using a water solution of hexanediamine in place of the bis-phenol A. A similar increase in viscosity in the unburnt fuel is again noted.

The preceding examples can be repeated with similar success by substituting the generically and specifically described reactants and operating conditions of this invention for those used in the preceding examples.

We claim:

1. A method for gelling a normally liquid hydrocarbon comprising admixing said hydrocarbon with an additive capable of effecting gelation of the hydrocarbon upon reaction with a suitable gelling initiator; placing said gelling initiator in a second containiner; mixing the liquid fuel and additive with the gelling initiator in the barrel of a flame thrower in proximity to the orifice of the barrel; ejecting the hydrocarbon as a gelled jet from said orifice and igniting the fuel at a point beyond the orifice.

2. The method of claim 1, wherein said additive is an admixture of an amine having 1 to 30 carbon atoms and said gelling initiator is carbon dioxide in excess of 1 mole carbon dioxide per 2 moles of said amine.

3. The method of claim 2, wherein traces of water are added to said admixture.

* * * * *